United States Patent
Chen

(10) Patent No.: US 6,385,042 B1
(45) Date of Patent: May 7, 2002

(54) PORTABLE COMPUTER STRUCTURE HAVING MODULE ROOM SUITABLE FOR MULTIPLE REPLACEABLE MODULES

(75) Inventor: Yao-Cheng Chen, Taipei (TW)

(73) Assignee: Inventec Corporation, Taipei (TW)

(*) Notice: Subject to any disclaimer, the term of this patent is extended or adjusted under 35 U.S.C. 154(b) by 0 days.

(21) Appl. No.: 09/573,491

(22) Filed: May 16, 2000

(51) Int. Cl.$^7$ ................................................. G06F 1/16
(52) U.S. Cl. .................... 361/686; 361/683; 361/685; 360/97.01; 710/101
(58) Field of Search ................ 361/679–687, 361/728–732, 735–740, 744, 790, 785, 792, 816, 818; 439/928; 312/223.2; 360/97.01; 369/75.1; 710/101–103; 395/282–283, 822, 281, 200.8; 709/250; 364/708.1; 429/96, 100, 97–98

(56) References Cited

U.S. PATENT DOCUMENTS

| | | | | |
|---|---|---|---|---|
| 5,363,273 A | * | 11/1994 | Ma | 361/686 |
| 5,430,617 A | * | 7/1995 | Hsu | 361/818 |
| 5,987,547 A | * | 11/1999 | Panasik et al. | 710/102 |
| 6,040,979 A | * | 3/2000 | Homer | 361/683 |
| 6,191,942 B1 | * | 2/2001 | Lee et al. | 361/683 |
| 6,208,506 B1 | * | 3/2001 | Pao | 361/683 |

FOREIGN PATENT DOCUMENTS

| | | | | |
|---|---|---|---|---|
| JP | 410124177 A | * | 3/1998 | G06F/1/16 |
| JP | 02000089853 A | * | 3/2000 | G06F/1/16 |

* cited by examiner

*Primary Examiner*—Leo P. Picard
*Assistant Examiner*—Michael Datskovsky

(57) ABSTRACT

A portable computer structure having a module room suitable for accommodating multiple replaceable modules is disclosed. The module room is arranged at a corner of the computer casing, and includes two openings on two surfaces of the corner, respectively. Further, owing to two openings in the module room for receiving a replaceable module therefrom, two walls opposite to the two openings can be mounted thereon respective two receptacle units for coupling to two types of plug units and thus two kinds of replaceable modules, respectively, to make electric connection between the module and the computer main frame. In other words, up to four kinds of modules can be used with the portable computer having one such module room. If two such module rooms are included in the portable computer structure, up to eight kinds of modules can be used therewith. If these two module rooms are identical, a module can be inserted into either of the module rooms as wish with still four kinds of modules to be optionally used with the portable computer.

17 Claims, 3 Drawing Sheets

PORTABLE COMPUTER STRUCTURE HAVING MODULE ROOM SUITABLE FOR MULTIPLE REPLACEABLE MODULES

FIELD OF THE INVENTION

The present invention relates to a portable computer structure, and more particularly to a portable computer structure including a module room suitable for receiving various replaceable modules.

BACKGROUND OF THE INVENTION

A portable computer is generally equipped with various peripheral devices such as floppy disk drive, hard disk drive, CD-ROM, DVD-ROM, battery, etc. Due to the compact size and carrying convenience of the portable computer, the peripheral devices are made to be replaceable modules which are inserted into the computer casing only when necessary.

Please refer to FIG. 1 which is a schematic diagram showing a conventional portable computer structure. The portable computer structure includes a module room 10 which has an opening 11 for receiving a replaceable module 20 therefrom. On the wall 12 of the module room 10 opposite to the opening 11, a receptacle unit 13 is mounted. After the module 20 is inserted into the module room 10 from the opening 11, as indicated by the arrow, a plug unit 21 on the rear side of the module 20 is coupled to the receptacle unit 13 to make electric connection. Generally, different modules have different types of plug units, so the receptacle unit in the module room is adapted to receive the plug unit of a specific module. In other words, one module room accommodates only one kind of module, and more than one module need more than one module room to rest in. Obviously, it will take much space of the computer structure to accommodate multiple modules.

Therefore, two staggered receptacle units are arranged on the same wall of each module room to alternatively accommodate two kinds of modules.

With rapid development of computer-related technique, however, two options of modules for each module room will be insufficient in the near future. Therefore, it is preferred that there are as many receptacle units as possible in each module room. If a third receptacle unit is further arranged on the same wall having thereon the first two receptacle units, the area of the wall will have to be enlarged, thereby enlarging the module room. As understood, the enlargement of the module room will render a large size of the computer casing as well as the module to be fit in the module room. It is obvious to run counter to the design principle of a portable computer structure.

On the other hand, it is preferred that the modules are replaced only when necessary. In other words, for a portable computer having two module rooms, it is preferred that the same module can be inserted into either one of the rooms. Although duplicated module rooms will be helpful for this purpose, the simple duplication of module rooms disadvantageously occupies the space of the computer structure.

SUMMARY OF THE INVENTION

Therefore, an object of the present invention is to provide a portable computer structure which includes a module room for alternatively receiving more than two kinds of replaceable modules without enlarging the size.

Another object of the present invention is to provide a portable computer structure which includes duplicated module rooms for convenient replacement of modules and more than two kinds of replaceable modules.

According to a first aspect of the present invention, a portable computer structure includes a computer casing and a module room located in the computer casing at a corner between a first surface and a second surface of the computer casing for accommodating a peripheral module having a plug unit on a rear side thereof. The module room includes a first opening located on the first surface, a second opening located on the second surface, a first wall opposite to the first opening, a second wall opposite to the second opening, and at least a first and a second receptacle units mounted on the first and the second wall, respectively. The peripheral module is inserted into the module room from the first opening when the plug unit of the peripheral module is coupled with the first receptacle unit, and the peripheral module is inserted into the module room from the second opening when the plug unit of the peripheral module is coupled with the second receptacle unit.

Preferably, the module room further includes a third and a fourth receptacle units respectively mounted on the first and the second walls. The peripheral module is inserted into the module room from the first opening when the plug unit of the peripheral module is coupled with the third receptacle unit, and the peripheral module is inserted into the module room from the second opening when the plug unit of the first peripheral module is coupled with the fourth receptacle unit. If all of the receptacle units are designed to be different, four types of plug units and thus four kinds of peripheral modules can be received in the same module room. On the other hand, if the first receptacle unit is identical to the second receptacle unit and the third receptacle unit is identical to the fourth receptacle unit, the same peripheral module can be inserted into the module room from either opening, depending on the user's posture or habit. In this case, however, the first receptacle unit is preferably different from the third receptacle unit, and the second receptacle unit is preferably different from the fourth receptacle unit so that it is assured that two kinds of peripheral modules can be optionally received by the single module room.

Preferably, the portable computer structure further includes another module room located in the computer casing at a corner between a third surface and a fourth surface of the computer casing for accommodating another peripheral module having a plug unit on a rear side thereof. The two module rooms are isolated from each other for example by a partition plate. The third and the fourth surfaces can be the same as the first and the second surfaces, respectively. The arrangement of the receptacle units in the two module rooms can be identical or different. If the arrangement is identical, the same peripheral module can be placed in either of the module rooms and exempt from frequent replacement. If the arrangement is different, relatively many kinds of peripheral units can be used with only two module rooms.

According to a second aspect of the present invention, a portable computer structure includes a computer casing and a module room located in the computer casing at a corner between a first surface and a second surface of the computer casing for accommodating a peripheral module having a receptacle unit on a rear side thereof. The module room includes a first opening located on the first surface, a second opening located on the second surface, a first wall opposite to the first opening, a second wall opposite to the second opening, and at least a first and a second plug units mounted on the first and the second walls, respectively. The peripheral module is inserted into the module room from the first opening when the receptacle unit of the peripheral module is coupled with the first plug unit, and the peripheral module is inserted into the module room from the second opening when the receptacle unit of the peripheral module is coupled with the second plug unit.

According to a third aspect of the present invention, a portable device structure includes a casing, and a module room located in the casing for accommodating a module having a connecting unit on a side thereof. The module room includes a first opening located on a first surface of the casing, a second opening located on a second surface of the casing, a first wall opposite to the first opening, a second wall opposite to the second opening, and at least a first and a second connected units, the first connected unit being mounted on the first wall, and the second connected unit being mounted on the second wall. The module is inserted into the module room from the first opening when the connecting unit of the module is coupled with the first connected unit, and the module is inserted into the module room from the second opening when the connecting unit of the module is coupled with the second connected unit.

The peripheral module can be a hard disk drive, a floppy disk drive, a CD-ROM, a DVD-ROM, a battery, or any other module adapted to be used in a portable device.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
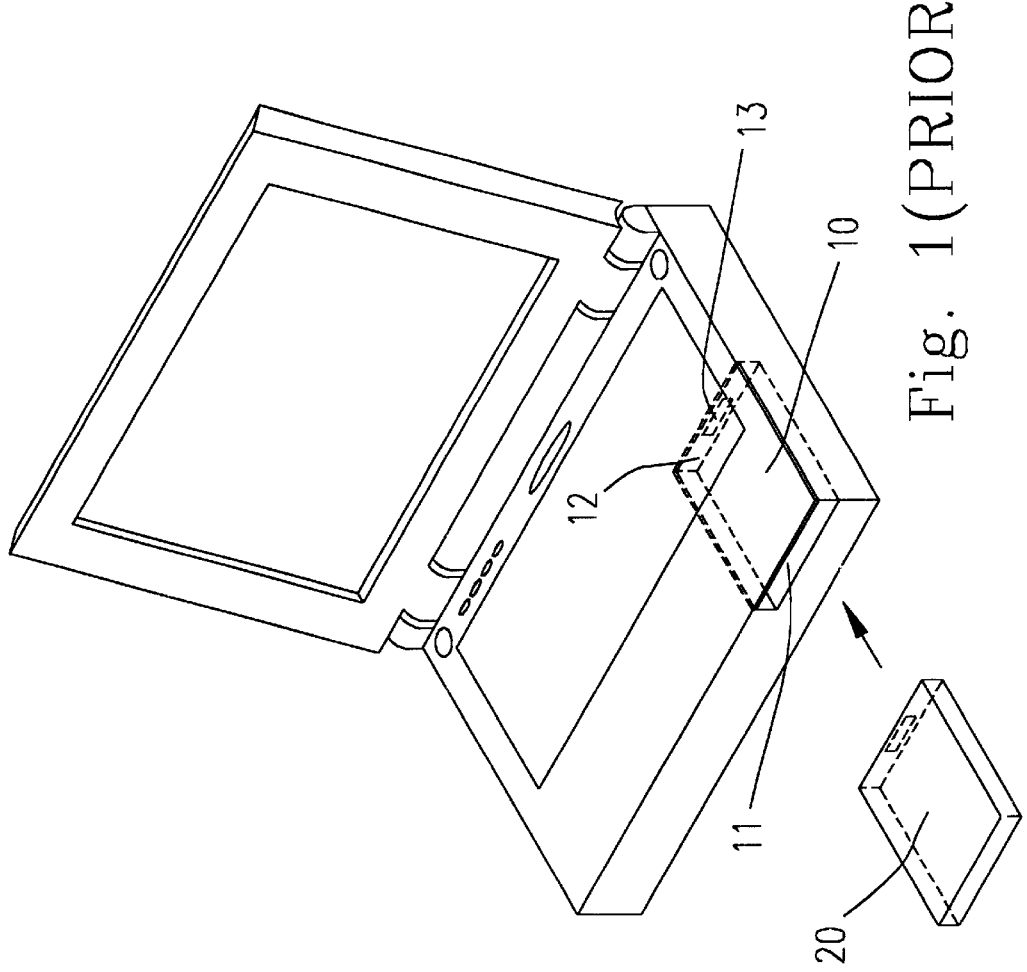
FIG. 1 is a schematic diagram showing a conventional portable computer structure.
Figure 2:
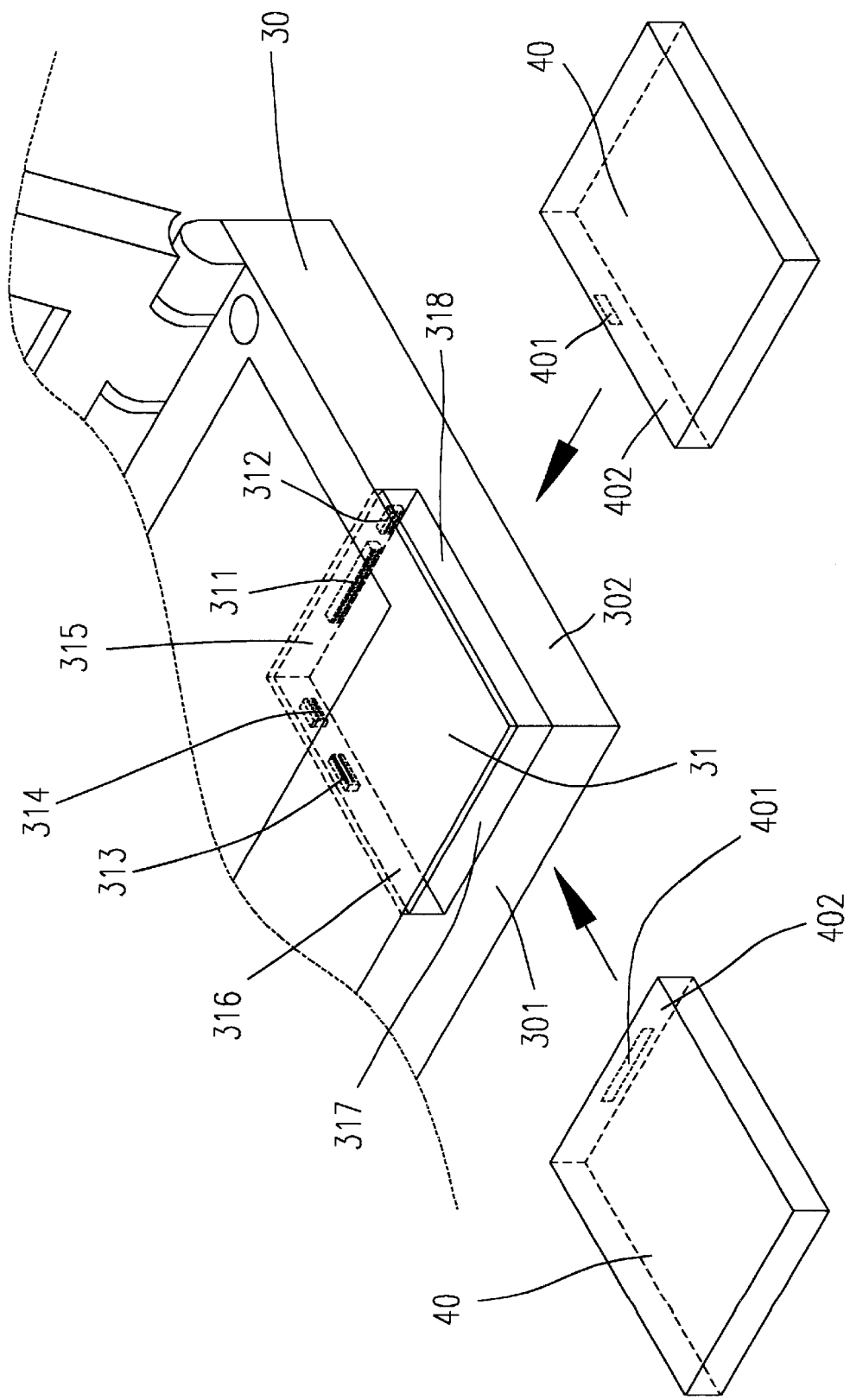
FIG. 2 is a schematic diagram showing a preferred embodiment of a portable computer structure according to the present invention.

Please refer to FIG. 2 which is a schematic diagram showing a preferred embodiment of a portable computer structure according to the present invention. The computer structure includes a computer casing 30 and a module room 31. The module room 31 is located in the computer casing 30 at a corner between a first surface 301 and a second surface 302 of the computer casing 30. When required, a replaceable peripheral module 40 such as a hard disk drive, a floppy disk drive, a CD-ROM, a DVD-ROM, a battery or any necessary device is inserted into the module room 31 to be used. Each module 40 has a plug unit 401 on a rear side 402 thereof, which is make electric connection with a receptacle unit mounted in the module room 31. In this embodiment, four different receptacle units 311~314 are present in the module room, respectively on the walls 315 and 316 as shown. Opposite to the walls 315 and 316, two openings 317 and 318 are created on the surfaces 301 and 302, respectively. Therefore, the module 40 is inserted into the module room 31 from the opening 317 to have the plug unit 401 coupled to the receptacle unit 311 or 312 to make electric connection, or from the opening 318 to have the plug unit 401 coupled to the receptacle unit 313 or 314 to make electric connection, depending on which receptacle unit is matched by the type of the plug unit 401. Owing to the four receptacle units 311~314 are different, four kinds of different modules can be optionally accommodated in the module room 31.

In general, the two openings 317 and 318 are located on the front face and an elevational side of the computer casing 30. Sometimes, owing to the surrounding space or the user's posture or habit, it is more convenient to insert the module 40 into the module room 31 from the front opening 317 than the side opening 318, and sometimes on the contrary. Therefore, by making the receptacle units 311 and 312 identical to the receptacle units 313 and 314, respectively, the same module 40 can be inserted into the module room 31 from either opening 317 or 318. However, the two receptacle units 311 and 312 or 313 and 314 are preferably different from each other so that it is assured that two kinds of peripheral modules can be optionally received by the single module room.

Figure 3:
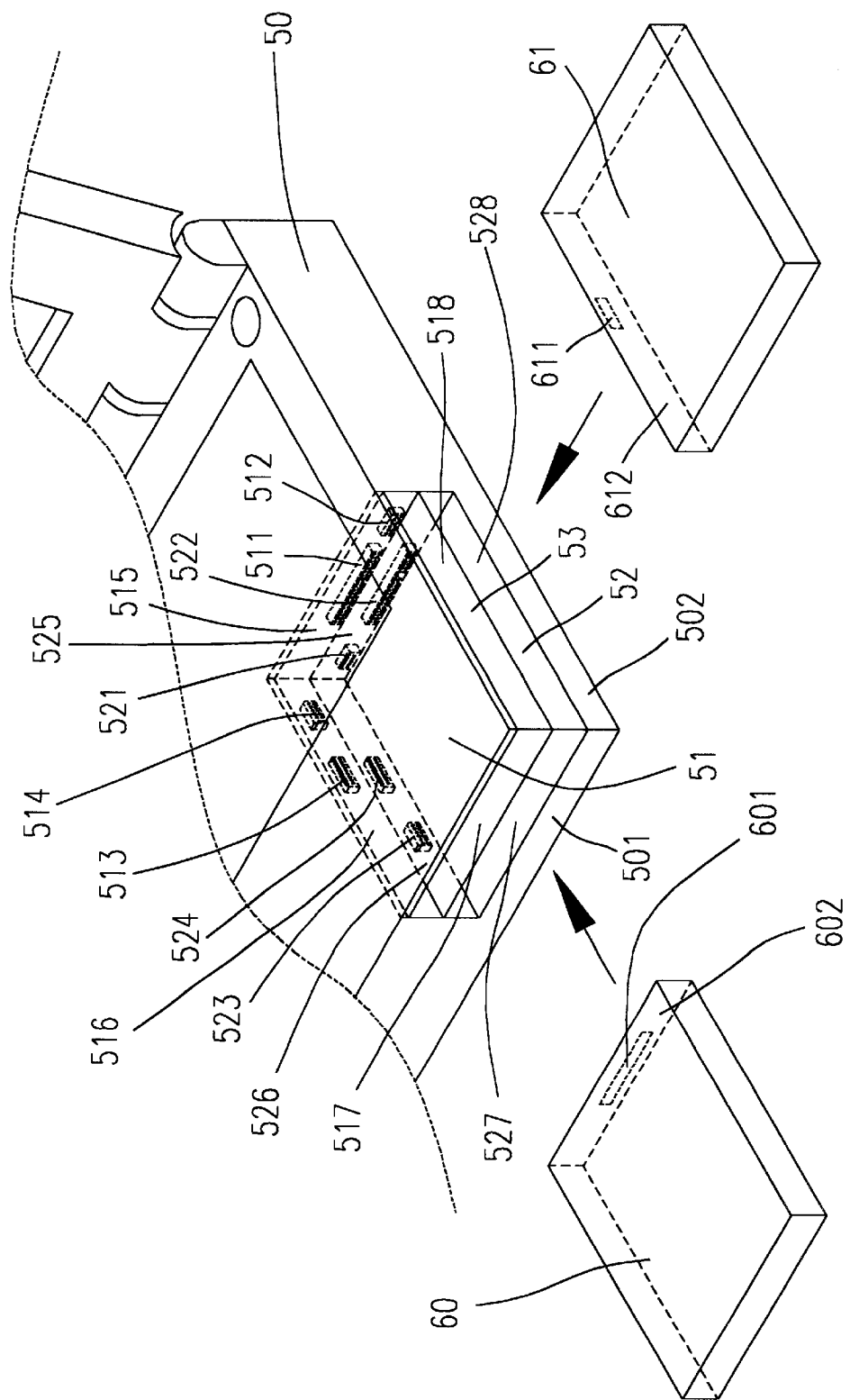
FIG. 3 is a schematic diagram showing another preferred embodiment of a portable computer structure according to the present invention.

Please refer to FIG. 3 which is a schematic diagram showing a preferred embodiment of a portable computer structure according to the present invention. The computer structure includes a computer casing 50 and two module rooms 51 and 52 divided by a partition plate 53. The module rooms 51 and 52 are both located in the computer casing 50 at a corner between the front and the side surfaces 501 and 502 of the computer casing 50. When required, two replaceable peripheral modules 60 and 61 selected from a hard disk drive, a floppy disk drive, a CD-ROM, a DVD-ROM, a battery or any necessary device are inserted into the module rooms 51 and 52, respectively, to be used. Each module 60 or 61 has a plug unit 601 or 611 on a rear side 602 or 612 thereof, which is make electric connection with a receptacle unit mounted in the module room 51 or 52. In this embodiment, four different receptacle units 511~514 or 521~524 are present in the each of the module rooms 51 or 52 on the walls 515~516 or 525~526 as shown. Opposite to the walls 515 and 516, two openings 517 and 518 are created on the surfaces 501 and 502, respectively. Likewise, two openings 527 and 528 are created on the surfaces 501 and 502 and opposite to the walls 525 and 526, respectively. Therefore, the module 60 is inserted into the module room 51 from the opening 517 to have the plug unit 601 coupled to the receptacle unit 511 or 512 to make electric connection, or from the opening 518 to have the plug unit 601 coupled to the receptacle unit 513 or 514 to make electric connection, depending on which receptacle unit is matched by the type of the plug unit 601. Likewise, the module 61 is inserted into the module room 52 from the opening 527 to have the plug unit 611 coupled to the receptacle unit 521 or 522 to make electric connection, or from the opening 528 to have the plug unit 611 coupled to the receptacle unit 523 or 524 to make electric connection, depending on which receptacle unit is matched by the type of the plug unit 611.

In this embodiment, if the four receptacle units 311~314 are completely different from the four receptacle units 321~324, eight kinds of different modules can be optionally used in the computer structure. On the contrary, if the four receptacle units 311~314 are identical to the four receptacle units 321~324, respectively, the modules 60 and 61 can be conveniently inserted into either of the module rooms as wish, and four kinds of different modules can still be optionally accommodated in the computer structure. For example, in a conventional computer structure having only one opening and two receptacle units mounted on the same wall in each module room, a floppy disk drive and a CD-ROM share a module room, and a spare hard disk drive and a spare battery share another module room. The floppy disk drive and the CD-ROM cannot be used at the same time, so do the spare hard disk drive and the spare battery. Therefore, they have to be frequently inserted and extracted. On the contrary, according to this embodiment of the present computer structure, any two of the floppy disk drive, the CD-ROM, the spare hard disk drive and the spare battery can be accommodated in the two module rooms at the same time as long as those modules are of the same size. Therefore, the computer structure according to the present invention is much more flexible than the conventional one.

Although in all the above embodiments, it is the plug unit mounted on the rear side of the peripheral module and it is the receptacle unit mounted in the module room, it is understood that the plug unit and the receptacle unit can be exchanged. Furthermore, any other types of connecting unit on the module and connected units in the module room can also be used as long as they can make electric connection between the module and the main frame after the module is inserted into the module room. Thus it is not necessary to have the mounting position of the connecting unit located on the rear side of the module.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similarstructures.

What is claimed is:

1. A portable computer structure, comprising:
   a computer casing; and
   a first module room located in said computer casing at a corner between a first surface and a second surface of said computer casing for accommodating a first peripheral module having a plug unit on a rear side thereof, said first module room including:
   a first opening located on said first surface;
   a second opening located on said second surface;
   a first wall opposite to said first opening;
   a second wall opposite to said second opening; and
   at least a first and a second receptacle units, said first receptacle unit being mounted on said first wall, and said second receptacle unit being mounted on said second wall,
   wherein said first peripheral module is inserted into said first module room from said first opening when said plug unit of said first peripheral module is coupled with said first receptacle unit, and said first peripheral module is inserted into said first module room from said second opening when said plug unit of said first peripheral module is coupled with said second receptacle unit.

2. The portable computer structure according to claim 1 wherein said first module room further includes a third receptacle unit mounted on said first wall, and said first peripheral module is inserted into said first module room from said first opening when said plug unit of said first peripheral module is coupled with said third receptacle unit.

3. The portable computer structure according to claim 2 wherein said first module room further includes a fourth receptacle unit mounted on said second wall, and said first peripheral module is inserted into said first module room from said second opening when said plug unit of said first peripheral module is coupled with said fourth receptacle unit.

4. The portable computer structure according to claim 3 wherein all of said receptacle units are different and used for receiving different types of plug units.

5. The portable computer structure according to claim 3 wherein said third receptacle unit is identical to said fourth receptacle unit.

6. The portable computer structure according to claim 5 wherein said first receptacle unit is identical to said second receptacle unit.

7. The portable computer structure according to claim 6 wherein said first receptacle unit is different from said third receptacle unit, and said second receptacle unit is different from said fourth receptacle unit.

8. The portable computer structure according to claim 1 further comprising a second module room located in said computer casing at a corner between a third surface and a fourth surface of said computer casing for accommodating a second peripheral module having a plug unit on a rear side thereof, said second module room being isolated from said first module room, and including:
   a third opening located on said third surface;
   a fourth opening located on said fourth surface;
   a third wall opposite to said third opening;
   a fourth wall opposite to said fourth opening; and
   at least a fifth and a sixth receptacle units, said fifth receptacle unit being mounted on said third wall, and said sixth receptacle unit being mounted on said fourth wall,
   wherein said second peripheral module is inserted into said second module room from said third opening when said plug unit of said second peripheral module is coupled with said fifth receptacle unit, and said second peripheral module is inserted into said second module room from said fourth opening when said plug unit of said second peripheral module is coupled with said sixth receptacle unit.

9. The portable computer structure according to claim 8 wherein said second module room further includes a seventh receptacle unit mounted on said third wall, and said second peripheral module is inserted into said second module room from said third opening when said plug unit of said second peripheral module is coupled with said seventh receptacle unit.

10. The portable computer structure according to claim 9 wherein said second module room further includes an eighth receptacle unit mounted on said fourth wall, and said second peripheral module is inserted into said second module room from said fourth opening when said plug unit of said second peripheral module is coupled with said eighth receptacle unit.

11. The portable computer structure according to claim 10 wherein all of said receptacle units are different and used for receiving different types of plug units.

12. The portable computer structure according to claim 10 wherein said first receptacle unit is identical to said fifth receptacle unit, said second receptacle unit is identical to said sixth receptacle unit, said third receptacle unit is identical to said seventh receptacle unit, and said fourth receptacle unit is identical to said eighth receptacle unit.

13. The portable computer structure according to claim 8 wherein said third surface is the same as said first surface, and said fourth surface is the same as said second surface.

14. The portable computer structure according to claim 8 wherein said first module room and said second module room are divided by a partition plate.

15. The portable computer structure according to claim 1 wherein said peripheral module is one selected from a group consisting of a hard disk drive, a floppy disk drive, a CD-ROM, a DVD-ROM, and a battery.

16. A portable computer structure, comprising:

a computer casing; and a module room located in said computer casing at a corner between a first surface and a second surface of said computer casing for accommodating a peripheral module having a receptacle unit on a rear side thereof, said module room including:
  a first opening located on said first surface;
  a second opening located on said second surface;
  a first wall opposite to said first opening;
  a second wall opposite to said second opening; and
  at least a first and a second plug units, said first plug unit being mounted on said first wall, and said second plug unit being mounted on said second wall, wherein said peripheral module is inserted into said module room from said first opening when said receptacle unit of said peripheral module is coupled with said first plug unit, and said peripheral module is inserted into said module room from said second opening when said receptacle unit of said peripheral module is coupled with said second plug unit.

17. A portable device structure, comprising:

a casing; and a module room located in said casing for accommodating a module having a connecting unit on a side thereof, said module room including:
  a first opening located on a first surface of said casing;
  a second opening located on a second surface of said casing;
  a first wall opposite to said first opening;
  a second wall opposite to said second opening; and
  at least a first and a second connected units, said first connected unit being mounted on said first wall, and said second connected unit being mounted on said second wall, wherein said module is inserted into said module room from said first opening when said connecting unit of said module is coupled with said first connected unit, and said module is inserted into said module room from said second opening when said connecting unit of said module is coupled with said second connected unit.

* * * * *